United States Patent
Kennedy et al.

(10) Patent No.: US 7,954,754 B2
(45) Date of Patent: Jun. 7, 2011

(54) MECHANICAL ACOUSTIC NOISE GENERATOR SYSTEM FOR SCRAMJET ENGINE

(75) Inventors: Kevin D. Kennedy, Huntsville, AL (US); Brian J. Smith, Huntsville, AL (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 611 days.

(21) Appl. No.: 12/131,248

(22) Filed: Jun. 2, 2008

(65) Prior Publication Data

US 2009/0297995 A1    Dec. 3, 2009

(51) Int. Cl.
*B64D 31/00*    (2006.01)

(52) U.S. Cl. ......... 244/53 B; 244/53 A; 60/737; 60/39.3

(58) Field of Classification Search ................ 244/53 B, 244/53 A, 53 R; 60/737, 39.3, 39.35, 735, 60/749
See application file for complete search history.

(56) References Cited

U.S. PATENT DOCUMENTS

| | | | |
|---|---|---|---|
| 6,263,660 B1 * | 7/2001 | Lawlor ........................... 60/776 |
| 6,371,414 B1 * | 4/2002 | Truax et al. ................... 244/201 |
| 7,735,601 B1 * | 6/2010 | Stieger et al. ................. 181/213 |
| 7,739,865 B2 * | 6/2010 | Prasad et al. ................. 60/226.1 |
| 2004/0016235 A1 * | 1/2004 | Lawlor et al. ................... 60/772 |
| 2008/0164378 A1 * | 7/2008 | Owens et al. ............... 244/53 B |
| 2010/0281766 A1 * | 11/2010 | Livshits ......................... 44/458 |

* cited by examiner

*Primary Examiner* — Christopher P Ellis
(74) *Attorney, Agent, or Firm* — Michael K. Gray

(57) ABSTRACT

A noise generator system is provided with each noise generator being pivotally mounted to a mounting surface associated with the air intake of a turbineless jet engine. Each noise generator is positioned so as to convert a laminar or transitional air stream into a turbulent air stream such that a turbulent air-fuel mixture is realized in the combustion section of the engine to achieve more efficient operation.

16 Claims, 4 Drawing Sheets

MECHANICAL ACOUSTIC NOISE GENERATOR SYSTEM FOR SCRAMJET ENGINE

DEDICATORY CLAUSE

The invention described herein may be manufactured, used and licensed by or for the U.S. Government for governmental purposes without payment of any royalties thereon.

BACKGROUND OF THE INVENTION

I. Field of the Invention

The present invention pertains to jet engines having no rotary compressor. More particularly the present invention pertains to a device for creating turbulent fluid flow into the combustion chamber or region of such a jet engine.

II. Discussion of the Background

A ramjet is a type of jet engine which includes an air inlet, combustion chamber and exhaust nozzle. The air inlet is designed to accommodate air moving at a supersonic speed. An inlet cone or body is situated within the air inlet and constricts air flow such that the received air is compressed and slows to a subsonic speed before entering the combustion chamber. For liquid-fuel type ramjets, the combustion chamber is provided with fuel injectors and flaming elements for combusting an air-fuel mixture. The combusted air-fuel mixture is then expelled through the exhaust nozzle to achieve propulsion. The ramjet has no moving parts and some have referred to it as resembling a stovepipe-type of hardware.

As previously indicated, to perform efficiently, the ramjet requires air to be input at supersonic speeds. Therefore, a ramjet-powered air vehicle must have an alternate engine or power source to initiate speeds which are sufficient in magnitude to effectively switch propulsion responsibilities to the ramjet.

FIG. 1 is a side-view cross-section of an exemplary cylindrically-shaped ramjet engine. The ramjet 10 has an inlet 12 for receiving inlet air 14 which preferably enters the inlet at a speed in excess of Mach 1. The shape of inlet cone or body 16 directs the inlet air 14 to a constricted flow path 18 which is formed by the ramjet casing 20 and the inlet body 16.

Upon exiting the constricted flow path 18 the inlet air enters the combustion chamber 22 which is provided with fuel injectors 24 located proximate to flaming elements or burners 26. Fuel exiting from the fuel injectors mixes with the compressed inlet air and the air-fuel mixture is combusted by the burners 26. The combusted air-fuel mixture exits as exhaust from exhaust nozzle 28.

A scramjet or supersonic combustion ramjet is similar in design to a ramjet. However, the airflow in the combustion chamber of a scramjet is supersonic. Accordingly, the air inlet of a scramjet is designed to allow compressed, supersonic airflow to continue into the combustion chamber.

FIG. 2 is a side-view cross-section of an exemplary cylindrically-shaped scramjet engine. The scramjet 30 is provided with a casing 32 within which is situated a center body 34 having an inlet region 36, a combustion region 38 and an exhaust nozzle region 40. An inlet 42 is formed from the inlet region 36 of center body 34 and the forward region 32F of casing 32. The center body 34 is contoured to form a constricted flow path 44 with the casing 32.

Within the constricted flow path 44 is a combustion section 46 which includes (in the liquid fuel-type scramjet) fuel injectors 48 in proximate relation to burners 50. The combusted air-fuel mixture exits the scramjet through the nozzle 52 which is formed from the exhaust nozzle region 40 of the center body 34 and the rearward portion 32R of casing 32.

The National Aeronautic and Space Administration (NASA) has invested heavily in scramjet technology. NASA's X-43A scramjet has been flown at a speed of Mach 9.6 and utilized a Pegasus booster rocket to achieve the hypersonic speeds necessary to initiate scramjet propulsion. Experiments with scramjets have resulted in a belief that the technology will eventually lead to hypersonic commercial aviation.

A problem encountered in the high speed environment of the scramjet has been the inability to efficiently mix air and fuel for optimal combustion. In aeronautics, it has been a typical design goal to achieve laminar airflow over as much of a wing or vehicle surface as possible. (Air that flows smoothly in a continuous stream is laminar, while an air stream that is rough or broken is turbulent. Transitional airflow, as the name implies, alternates or transitions between laminar and turbulent conditions.)

In the prior art, the airflow received in the combustion chamber or combustion section of a SCRAMJET has been laminar or transitional in nature which has resulted in less than optimal mixing and combustion.

SUMMARY OF THE INVENTION

One object of the present invention is to make a SCRAMJET more efficient.

Another object of the present invention is to improve SCRAMJET reliability and safety.

These and other valuable objects are realized by a system for creating turbulent airflow in a combustor section of a type of jet engine not having a rotary compressor (i.e., a turbineless engine). The system includes a mounting surface or platform and at least one noise generator connected to the mounting surface. The noise generators are positioned forward of the combustion section for purposes of converting an air stream (which is laminar or transitional) into a turbulent air stream. The turbulent air stream reaches the combustion section at a supersonic speed. The noise generators are pivotally attached to the mounting surface. The noise generators are wedge-shaped with each having a top and a bottom through which a pivot pin extends so that each noise generator can move or rotate back and forth on the mounting surface (in directions lateral to the incoming air stream).

A plurality of noise generators can be spaced apart on the mounting surface. Each noise generator of the plurality of noise generators is pivotally connected to the mounting surface. Each of the noise generators has a pivot pin which extends through the noise generator and is offset from a center line of the noise generator such that the pivot pin does not contact the center of mass of the respective noise generator.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DETAILED DESCRIPTION

Figure 1:
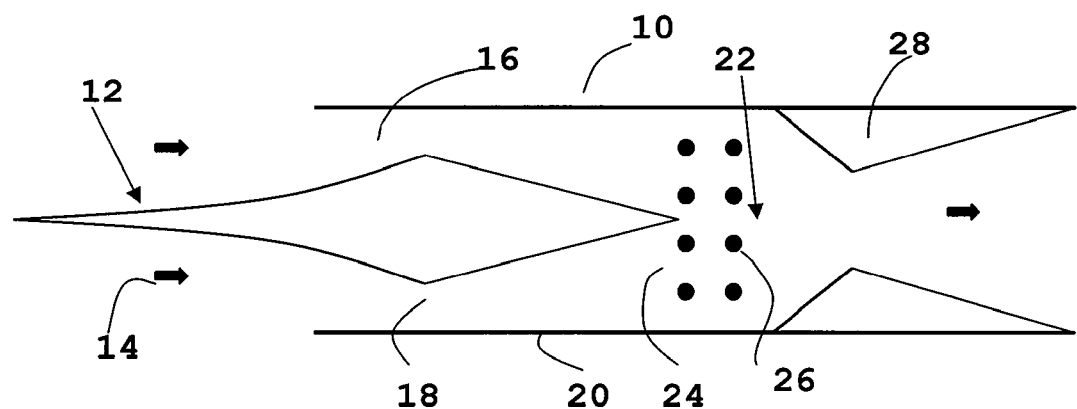
FIG. 1 is side-view, longitudinal cross-section of an exemplary ramjet engine.
Figure 2:
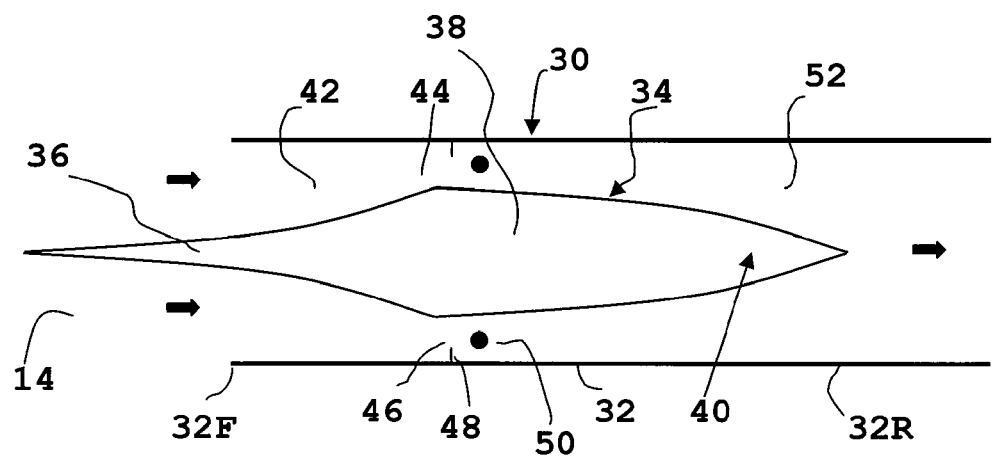
FIG. 2 is side-view, longitudinal cross-section of an exemplary scramjet engine.
Figure 3:
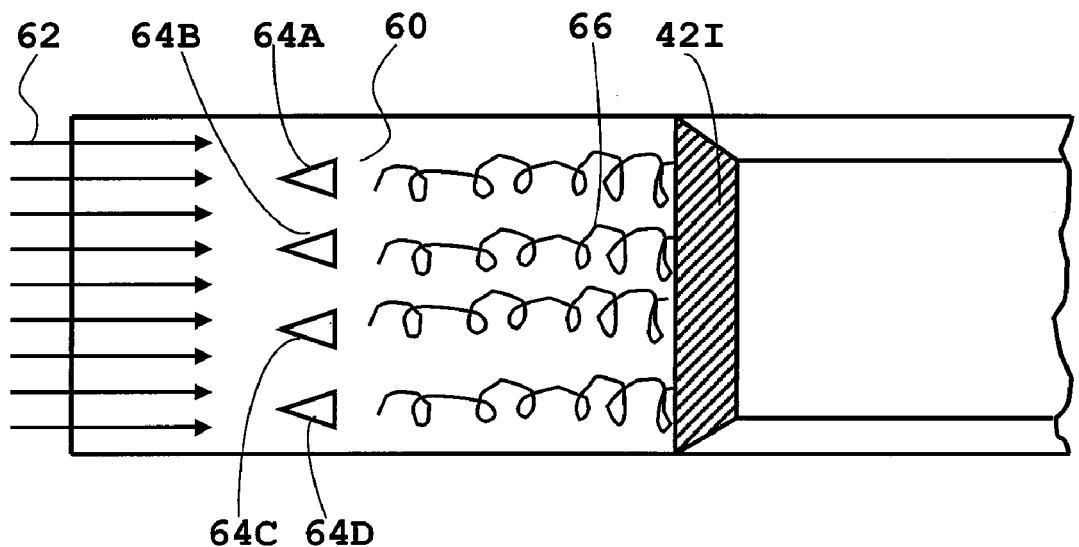
FIG. 3 is a schematic view of the acoustic noise-generation system of the present invention.

With reference to FIG. 3, the air intake or inlet 421 of a scramjet engine (having an inlet, combustion region and exhaust nozzle) is attached to a mounting surface or support deck 60. Supersonic laminar airflow is indicated by arrows 62 which are aligned with inlet 421. Placed forward of inlet 421 are a plurality of acoustic noise generators or elements 64A, 64B, 64C, 64D.

Each acoustic noise generator 64 is attached to mounting surface 60 for the purpose of creating a turbulent airflow 66 to be received by the combustion section of the engine. The mounting surface 60 can be a part of the fuselage or skin or an air vehicle, or can be a properly contoured extension of the scramjet's casing which extends forward of the air intake region, or can be an appropriate structure which allows the acoustic noise generators to be mounted in the airflow path forward of the combustion section of the scramjet.

Figure 4:
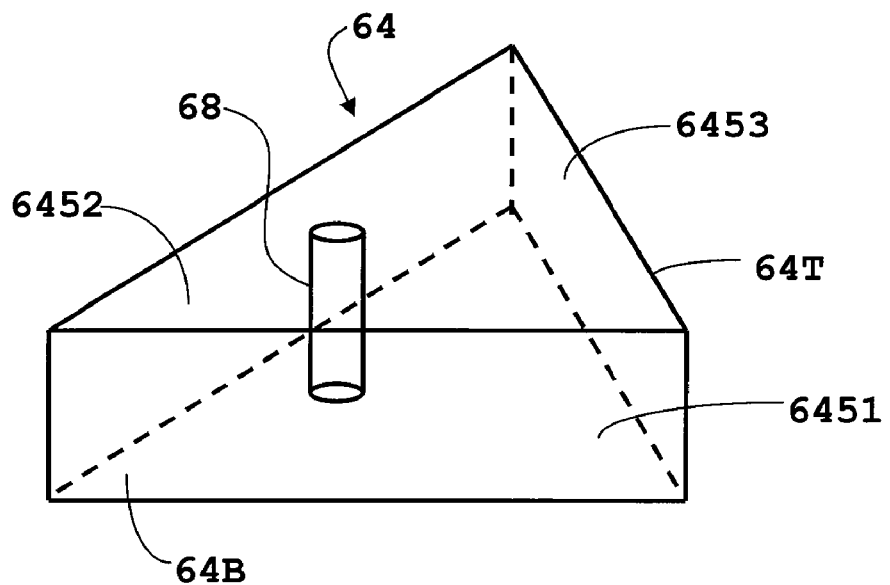
FIG. 4 is an x-ray perspective view of an acoustic noise generator according to the present invention.

Each acoustic noise generator 64 is wedge-shaped. The x-ray perspective view of FIG. 4 demonstrates that the noise generator element 64 has a triangular-shaped top 64T and a triangular-shaped bottom 64B with three rectangular sides 64S1, 64S2 and 64S3. The acoustic noise generator has an aperture which extends from its triangular-shaped top 64T through its triangular-shaped bottom 64B to accommodate a pivot pin 68. The pivot-pin 68 has heads or caps on both ends which are greater in diameter than the shaft of the pivot-pin to allow the pivot pin 68 to be firmly secured to the mounting surface 60. Other securing techniques known in the art are acceptable. As such, each noise generator 64 is pivotably mounted to the mounting surface 60. The use of a small sealed bearing can be used to reduce friction between the pivot pin and noise generator.

Figure 5:
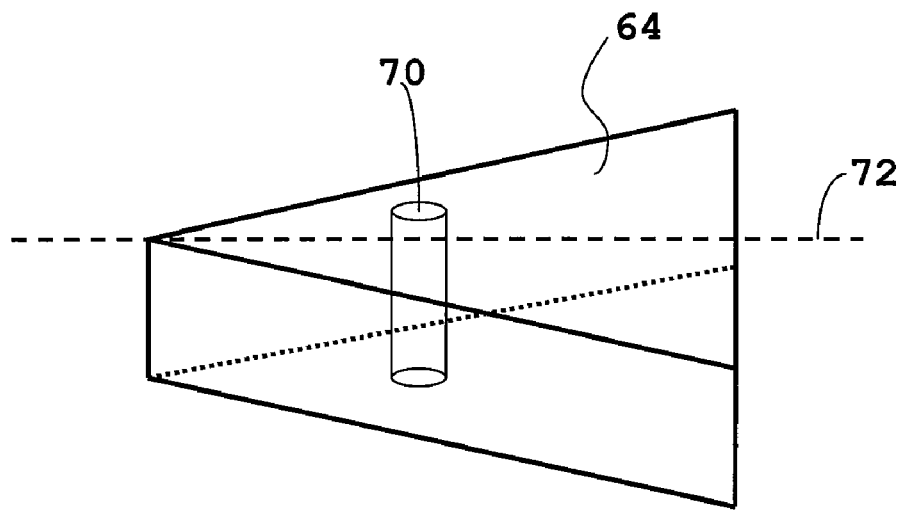
FIG. 5 is a perspective view of an acoustic noise generator of the present invention which demonstrates that the pivot-pin aperture in the acoustic noise generator is offset from a center line.
Figure 6:
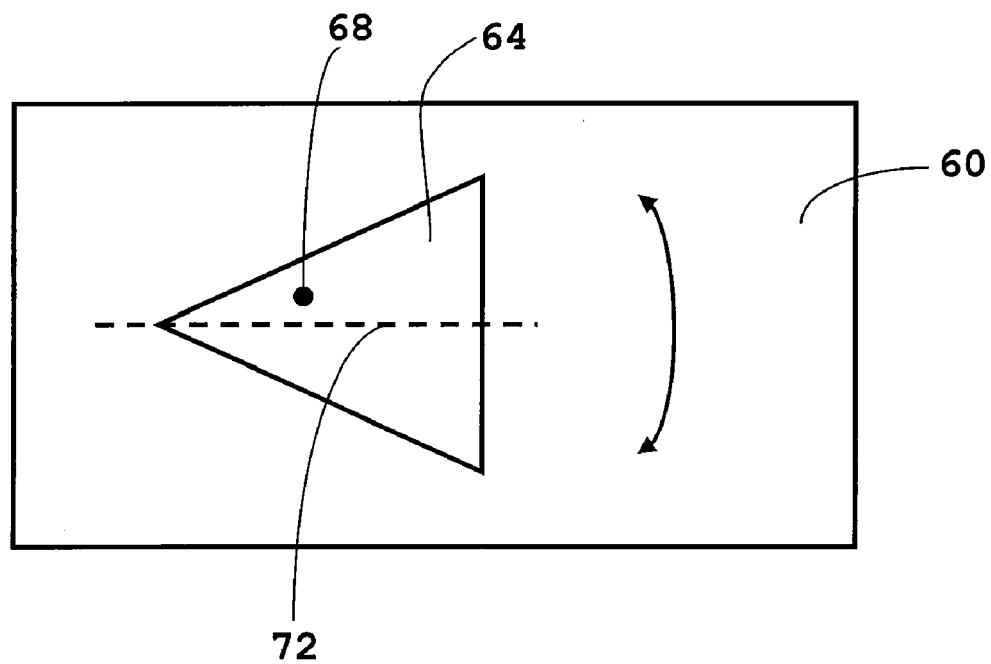
FIG. 6 is a plan view of an acoustic noise generator according to the present pivotably mounted to a support surface.

In FIG. 5, the pivot pin aperture 70, in accordance with the teachings of the present invention, is offset from center line 72 of the noise generator 64. Accordingly, the pivot pin 68 does not extend through the center of mass of the noise generator 64.

The offset causes each noise generator 64 to rotate back and forth due to the air stream flowing over the air inlet area. The kinetic energy of the air vehicle results in the rotation of the noise generators so no drive mechanism or power is required for noise generator movement. To keep the drag values low, each noise generator is sized to remain within the boundary layer flow, i.e. the layer of airflow aligned with the air inlet.

The airflow conditions typically found at an altitude above 30 km and above Mach 10 are such that the air is laminar to transitional in nature. Such conditions reduce the mixing capacity of the air-fuel mixture to be combusted. In the present invention, the back and forth rotation of the noise generators causes the airflow entering the combustion section of a scramjet to be fully turbulent with an increased Reynold's Number.

Since the airflow through a scramjet engine is supersonic, little time exists to combust the air fuel mixture. Making the airflow in the combustor section fully turbulent dramatically enhances the mixing of air and fuel and significantly improves the efficiency of the scramjet engine.

Figure 7:
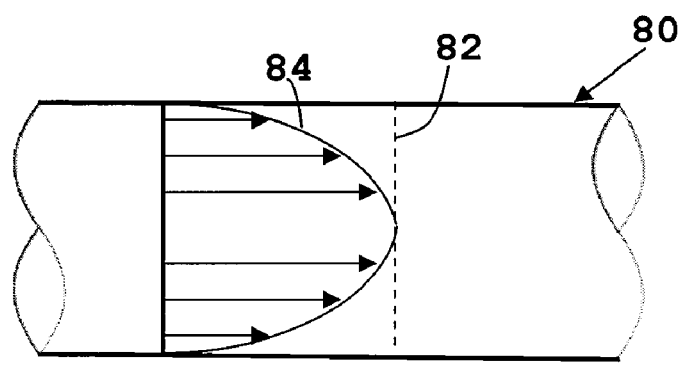
FIG. 7 is an exemplary illustration of the velocity distribution of laminar airflow in a pipe.
Figure 8:
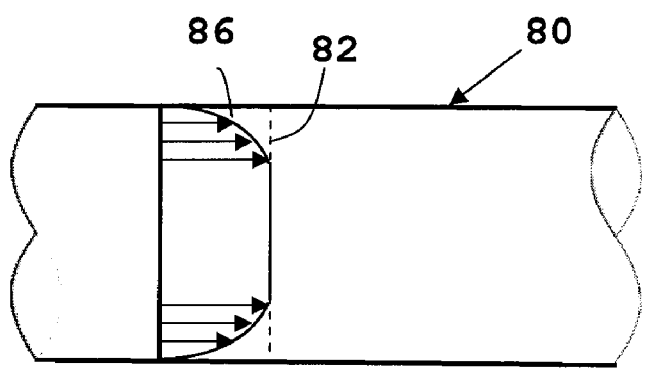
FIG. 8 is an exemplary illustration of the velocity distribution of turbulent airflow in a pipe.

This enhanced performance of the engine can be explained to some degree by reference to FIGS. 7 and 8.

In FIG. 7, laminar air flow in pipe 80 results in a parabolic velocity curve 84 with the vertex of the parabola touching a cross section 82 of the pipe. Thus, the fastest traveling air which is small in concentration or density is located at the center of the pipe.

The great bulk of the laminar air flow in FIG. 7 travels at a lesser speed in parabolic distribution behind the vertex. If it is desired to combust an air fuel mixture traveling at supersonic speed along section 82, it is apparent that inefficiencies would result.

In FIG. 8, a turbulent flow of air traveling in pipe 80 has a velocity curve 86 which is relatively flat or planar with cross section 82. If an air-fuel mixture is combusted at selected locations at cross section 82, the efficiency of combustion of the air fuel mixture will be significantly improved over the situation found in FIG. 7.

The teachings of the present invention allow for more efficient and safer operation of a scramjet engine.

Various modifications of the present invention will be possible to those of skill in the art. Accordingly the scope of the invention is limited only by the claim language which follows hereafter.

What is claimed is:

1. A system for creating turbulent airflow in a combustor section of a turbineless jet engine, comprising:
   a mounting surface;
   at least one noise generator connected to said mounting surface; and
   wherein said at least one noise generator is positioned forward of the combustion section for purposes of converting an air stream into a turbulent air stream;
   said at least one noise generator is pivotally attached to said mounting surface;
   said at least one noise generator has a pivot pin which extends through said at least one noise generator without contacting the center of mass of said at least one noise generator; and
   said pivot pin is offset from a center line of said at least one noise generator.

2. A system according to claim 1, wherein:
   said at least one noise generator is a plurality of noise generators.

3. A system according to claim 2, wherein:
   said plurality of noise generators are pivotally attached to said mounting surface.

4. A system according to claim 1, wherein:
   said at least one noise generator is wedge-shaped.

5. A system according to claim 4, wherein:
   said at least one noise generator has a top and a bottom through which said pivot pin extends such that said at least one noise generator can rotate above said mounting surface.

6. A system according to claim 2, wherein:
   said plurality of noise generators are spaced apart on said mounting surface with each noise generator of said plurality of noise generators being pivotally connected to said mounting surface.

7. A system according to claim 6, wherein:
each noise generator of said plurality of noise generators has a corresponding pivot pin which allows said each noise generator to be rotatable on said mounting surface.
8. A system according to claim 4, wherein:
said at least one noise generator has a pivot pin which extends through said at least one noise generator without contacting the center of mass of said at least one noise generator.
9. A system according to claim 1, wherein:
said turbulent air stream when reaching said combustion section is traveling at a supersonic speed.
10. A system according to claim 8, wherein:
said turbulent air stream when reaching said combustion section is traveling at a supersonic speed.
11. A system according to claim 1, wherein:
said air stream being converted is a laminar air stream.
12. A system according to claim 1, wherein:
said air stream being converted is a transitional air stream.
13. A system according to claim 11, wherein:
said laminar air stream travels at a supersonic speed.
14. A system according to claim 12, wherein:
said transitional air stream travels at a supersonic speed.
15. A system according to claim 1, wherein:
the jet engine is a scramjet engine.
16. A system according to claim 6, wherein:
said corresponding pivot pin of each noise generator of said plurality of noise generators allows said each noise generator to move back and forth on said mounting surface.

* * * * *